(12) United States Patent
Rose

(10) Patent No.: US 12,412,480 B2
(45) Date of Patent: Sep. 9, 2025

(54) DEVICE, COMPUTER PROGRAM AND METHOD FOR MONITORING AN UAV

(71) Applicants: Sony Group Corporation, Tokyo (JP); SONY EUROPE B.V., Weybridge (GB)

(72) Inventor: Nicolas Rose, Basingstoke (GB)

(73) Assignees: Sony Group Corporation, Tokyo (JP); Sony Europe B.V., Weybridge (GB)

( * ) Notice: Subject to any disclaimer, the term of this patent is extended or adjusted under 35 U.S.C. 154(b) by 0 days.

(21) Appl. No.: 17/908,205

(22) PCT Filed: Jan. 29, 2021

(86) PCT No.: PCT/GB2021/050205
§ 371 (c)(1),
(2) Date: Aug. 30, 2022

(87) PCT Pub. No.: WO2021/198634
PCT Pub. Date: Oct. 7, 2021

(65) Prior Publication Data
US 2023/0105120 A1 Apr. 6, 2023

(30) Foreign Application Priority Data
Mar. 31, 2020 (GB) .................................. 2004729

(51) Int. Cl.
*G08G 5/55* (2025.01)
*B64C 39/02* (2023.01)
(Continued)

(52) U.S. Cl.
CPC ............. *G08G 5/55* (2025.01); *B64C 39/024* (2013.01); *B64U 70/00* (2023.01); *G08G 5/57* (2025.01);
(Continued)

(58) Field of Classification Search
CPC ........ G08G 5/0069; G08G 5/006; G08G 5/55; G08G 5/57; G08G 5/59; B64C 39/024; B64U 2201/20; B64U 70/00; H04K 3/825
(Continued)

(56) References Cited

U.S. PATENT DOCUMENTS 9,646,502 B1 5/2017 Gentry
9,858,822 B1 1/2018 Gentry
(Continued)

FOREIGN PATENT DOCUMENTS

CN 205003849 U 1/2016
CN 106448271 A 2/2017
(Continued)

OTHER PUBLICATIONS

International Search Report and Written Opinion from corresponding International Application No. PCT/GB2021/050205, mailed on May 7, 2021, 12 pages.
(Continued)

*Primary Examiner* — Isaac G Smith
(74) *Attorney, Agent, or Firm* — Tucker Ellis, LLP

(57) ABSTRACT

A method comprising: locating an Unmanned Aerial Vehicle (UAV) which is in breach of a predetermined rule; communicating an indication of the breach to the UAV; monitoring the movement of the UAV following the communication of the breach; and in the event of the movement being below a threshold amount after a predetermined time, the method comprises: notifying another device of the movement being below the threshold amount.

13 Claims, 14 Drawing Sheets

(51) Int. Cl.
  *B64U 70/00* (2023.01)
  *G08G 5/57* (2025.01)
  *G08G 5/59* (2025.01)
  *H04K 3/00* (2006.01)

(52) U.S. Cl.
  CPC ........... *G08G 5/59* (2025.01); *B64U 2201/20* (2023.01); *H04K 3/825* (2013.01)

(58) Field of Classification Search
  USPC ............................................................ 701/2
  See application file for complete search history.

(56) References Cited

U.S. PATENT DOCUMENTS

| | | | |
|---|---|---|---|
| 2008/0255711 A1* | 10/2008 | Matos | G08G 5/58 701/2 |
| 2012/0022719 A1 | 1/2012 | Matos | |
| 2012/0210853 A1* | 8/2012 | Abershitz | B64F 1/04 89/1.11 |
| 2017/0092138 A1 | 3/2017 | Trundle | |
| 2017/0234966 A1 | 8/2017 | Naguib | |
| 2017/0278404 A1 | 9/2017 | Gordon | |
| 2017/0301220 A1* | 10/2017 | Jarrell | H04W 4/70 |
| 2017/0358213 A1 | 12/2017 | Priest | |
| 2019/0025858 A1* | 1/2019 | Bar-Nahum | G05D 1/0094 |
| 2019/0149696 A1 | 5/2019 | Drako | |
| 2020/0363824 A1* | 11/2020 | Levin | G01S 13/862 |
| 2021/0065566 A1* | 3/2021 | Li | B64C 1/36 |

FOREIGN PATENT DOCUMENTS

| | | | |
|---|---|---|---|
| CN | 106687876 A | | 5/2017 |
| CN | 107409174 A | | 11/2017 |
| CN | 107424442 A | | 12/2017 |
| CN | 107481507 A | | 12/2017 |
| CN | 107507424 A | | 12/2017 |
| CN | 107531324 A | | 1/2018 |
| CN | 107615359 A | | 1/2018 |
| CN | 107615785 A | | 1/2018 |
| CN | 107784413 A | | 3/2018 |
| CN | 108520641 A | | 9/2018 |
| CN | 109034446 A | | 12/2018 |
| CN | 109785670 A | | 5/2019 |
| GB | 2546438 A | | 7/2017 |
| KR | 20190021875 A | * | 3/2019 |
| WO | 2019067695 A1 | | 4/2019 |
| WO | 2019203698 A1 | | 10/2019 |
| WO | 2020072387 A1 | | 4/2020 |

OTHER PUBLICATIONS

Global UTM Association, "UAS Traffic Management Architecture", Apr. 2017, 27 pages.

* cited by examiner

DEVICE, COMPUTER PROGRAM AND METHOD FOR MONITORING AN UAV

BACKGROUND

Field of the Disclosure

The present technique relates to a device, computer program and method.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present technique.

There are an increasing number of Unmanned Aerial Vehicles (UAVs) being used in modern life. These may be used to deliver of goods to a customer's home, capturing aerial photographs and videos and the like. Indeed, even at higher altitudes (such as orbiting the Earth), an increasing number of satellites are being utilised. For example, Low Earth Orbit (LEO) satellites are being considered to provide Internet connectivity to remote locations.

These UAVs typically follow predefined flight paths to complete their tasks. However, on occasion, other UAVs may be used to which can interrupt the flight path and may hinder or damage the UAV whilst on its route.

In addition, on occasion, UAVs may be used to enter forbidden airspace. Forbidden airspace may include flying over an airport or over private property. In some instances, movie sets may have a no-fly zone around its perimeter to ensure that UAVs cannot take aerial photos of the movie set.

It is an aim of the disclosure to address at least one of these issues.

SUMMARY

A method comprising: locating an Unmanned Aerial Vehicle (UAV) which is in breach of a predetermined rule; communicating an indication of the breach to the UAV; monitoring the movement of the UAV following the communication of the breach; and in the event of the movement being below a threshold amount after a predetermined time, the method comprises: notifying another device of the movement being below the threshold amount.

According to embodiments, there is provided a method comprising: locating an Unmanned Aerial Vehicle (UAV) which is in breach of a predetermined rule; communicating an indication of the breach to the UAV; and in the event that no response is received from the UAV that identifies the UAV, the method comprises: notifying another device of the location of the UAV.

According to embodiments, there is provided a method comprising: locating the geographical position of an Unmanned Aerial Vehicle (UAV) at a first time and at a second, different, time; capturing information identifying the UAV; notifying another device of the location of the UAV at the second time, the another device being selected from a plurality of another devices, wherein the another device is selected based on the flight plan of the another device.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1A:
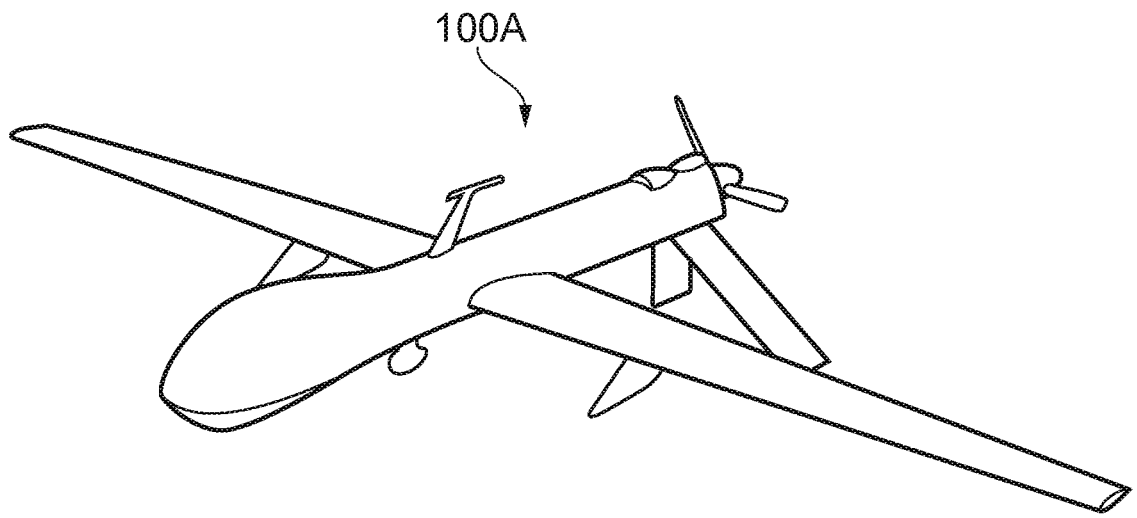
FIGS. 1A and 1B show examples of UAVs.

Referring now to the drawings, wherein like reference numerals designate identical or corresponding parts throughout the several views.

Figure 1B:
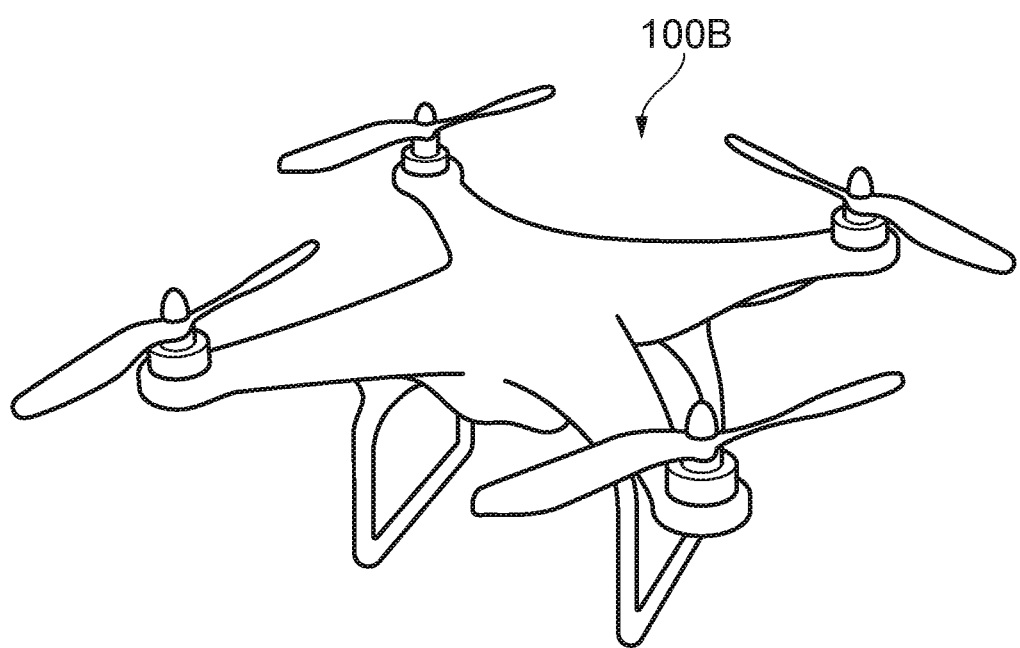

FIGS. 1A and 1B show example types of UAVs. FIG. 1A shows a fixed-wing type UAV 100A and FIG. 1B shows a rotary type UAV 100B. Although the embodiments of the disclosure are described with reference to these types of UAV, the disclosure is not so limited and other types of flying object are envisaged such as satellites orbiting the earth or the like. The present disclosure is described with reference to rotary type UAV 100B but the disclosure is not limited.

Overview

A brief overview of embodiments of the disclosure will now be provided.

FIG. 2A-2D shows an arrangement 200 with a surveillance drone 100B1 monitoring an airspace 205. Although the below is explained with reference to one or more drones, the disclosure is not so limited. In fact any unmanned aerial vehicle (UAV) that includes drones, satellites or the like is envisaged. The surveillance drone 100B1 may survey the airspace using any one or combination of techniques. For example, the surveillance drone 100B1 may be equipped with one or more image sensor and associated optics to capture an image of the scene which may be analysed to identify other flying objects, Time-of-Flight sensors, LIDAR sensors, radar equipment used to identify other objects, Infrared sensors, RF sensors to detect radio frequency signals indicative of control signals being sent to and emitted from flying objects or the like. In embodiments, the surveillance drone 100B1 may have a specific role of policing airspace or may have a specific flight plan to police airspace. In embodiments, the surveillance drone may be any drone capable of surveillance and may have resources to perform surveillance of airspace whilst performing some other task, such as delivering goods or performing ground surveillance.

The airspace 205 includes a no-fly zone 215. In embodiments, 205 represents a 3D volume of space. In embodiments, the no-fly zone 215 may be located over a movie set, airport or private dwelling. In some instances, the no-fly zone 215 may be permanent (such as over an airport) or may be temporary (such as over the movie set or location where an event such as a concert is taking place). The no-fly zone 215 is indicated by hatch lines. The no-fly zone may be defined by co-ordinates in 3D space. In embodiments, it may be provided to a centralised system such as the Global UTM (Unmanned Traffic Management) Association which provides rules to operators of drones to ensure airspace is used correctly.

Within the airspace 205 is located a second drone 110B3. The second drone 110B3 may be a drone travelling along a flight path or may be a drone that is completing a task such as surveying an area. The second drone 100B3 may be owned by the same person (legal or natural) as the surveillance drone 100B1 or may be independent of the surveillance drone 100B1. For example the second drone 100B3 may be owned or operated by an independent third party such as delivery company or the like. The field of view of the second drone 100B3 is shown by area 210.

Figure 2A:
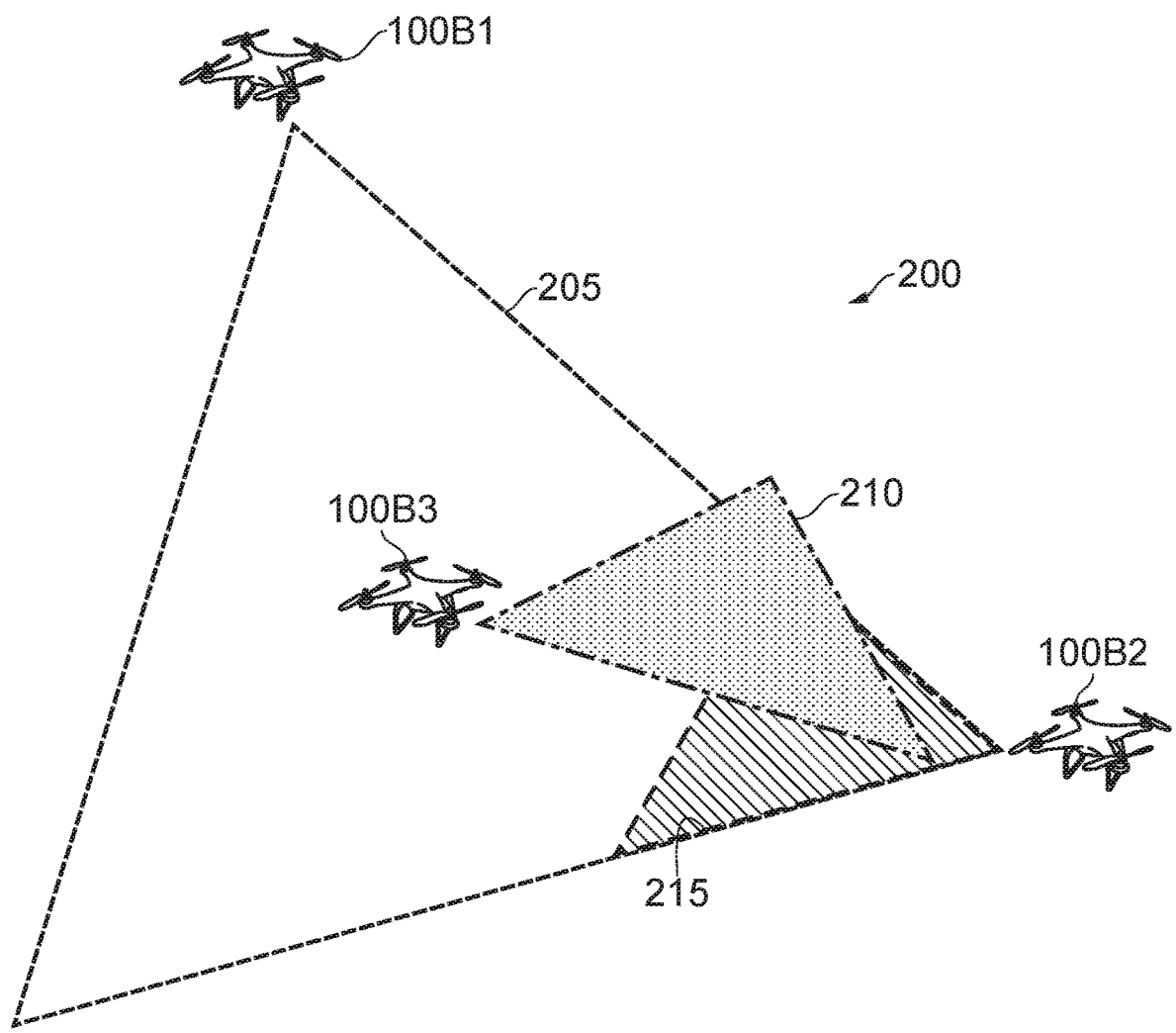
FIG. 2A-2D shows an arrangement 200 with a surveillance drone 100B1 monitoring an airspace 205.

An unauthorised drone 100B2 is also shown. The unauthorised drone 100B2 may be a drone that is operated in an unregulated manner or is regulated by an organisation such as the Global UTM Association but which has moved off its approved flight path. In FIG. 2A, the unauthorised drone 100B2 has just entered the no-fly zone 215 which is under the surveillance of the surveillance drone 100B1. As will be explained later, the unauthorised drone 100B2 will be notified of a breach of a predetermined rule by it entering the no-fly zone 215. This communication may be performed by the surveillance drone 100B1 or by the Global UTM Association. In embodiments the unregulated manner may be that the drone communicating its identity in radio signals. There may be requirements to communicate its identity. The requirements may be to periodically communicate its identity and/or to incorporate its identity in other communicated signals. Communicating its identity may be by broadcast or by point to point communication or point to multipoint communication. Communicating its identity may be with a UTM and/or with other drones or infrastructure.

The Global UTM Association is an organisation that defines protocols by which UAVs operate. It sets out guiding principles around which UAV traffic management is carried out. This ensures that as more UAVs are used (and so their density in the airspace increases), the UAVs operate safely and allow the airspace is shared appropriately with other UAVs and aviation in general.

Figure 2B:
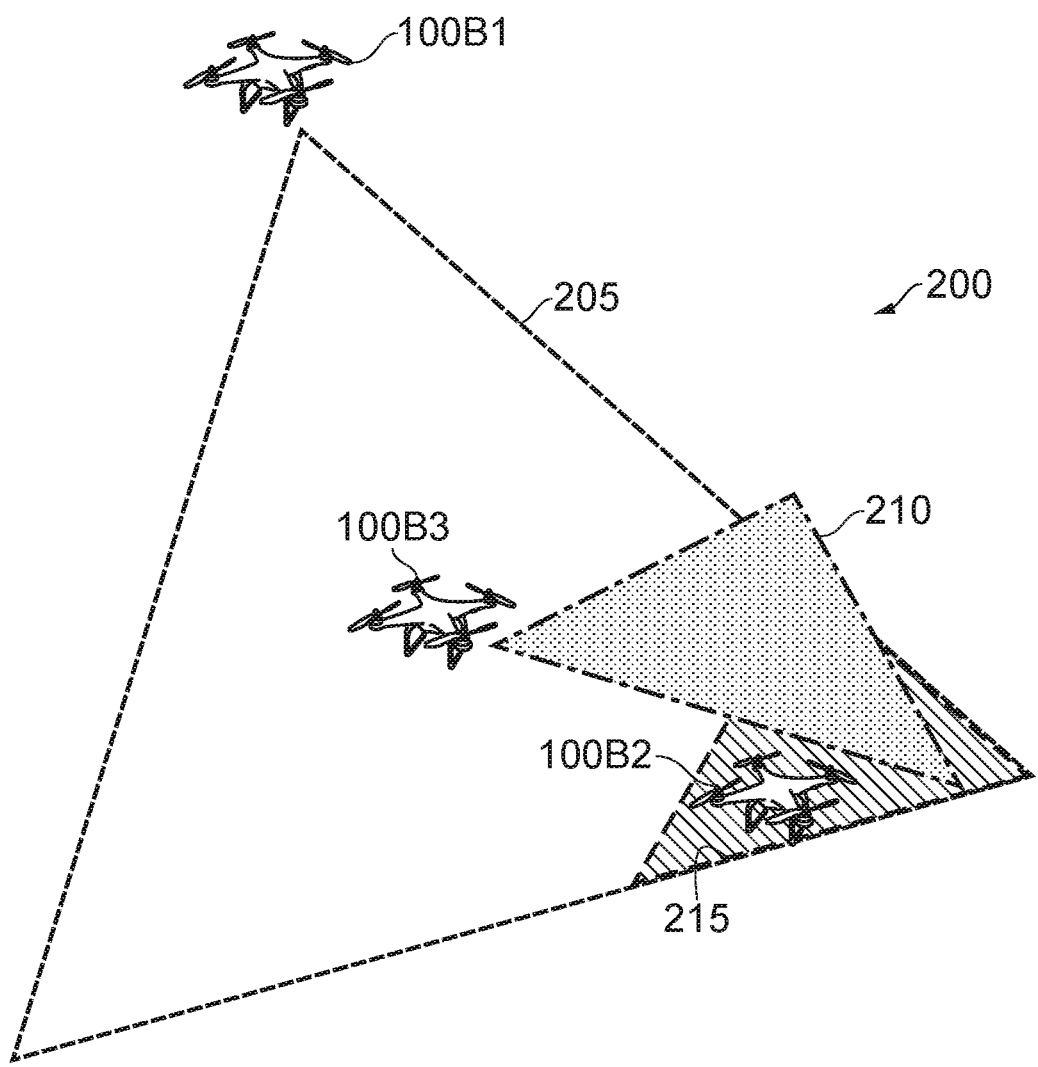

As will become apparent from FIG. 2B, the unauthorised drone 100B2 moves further into the no-fly zone 215 of the airspace 205 under surveillance of the surveillance drone 100B1. This means that the unauthorised drone 100B2 is in breach of a predetermined rule by flying into the no-fly zone. Of course, other predetermined rules may be breached by an unauthorised drone. For example, the unauthorised drone 100B2 may enter an area of airspace at the incorrect time or may follow a non-approved flight path, or follow the flight path at the incorrect time.

It will be appreciated from FIG. 2B that the position of the unauthorised drone 100B2 is outside the field of view 210 of the second drone 100B3.

The position of the unauthorised drone 100B2 is still within the airspace 205 which is surveyed by surveillance drone 100B1. However, the position of the unauthorised drone 100B2 is very close to the edge of the airspace surveyed by the surveillance drone 100B1 and the edge of the no-fly zone 215. Accordingly, evidence of the breach will need to be provided by a second UAV (such as a second drone) to confirm the breach of the predetermined rule.

Moreover, it is possible that action may be taken against the unauthorised drone 100B2 or its operator for breach of the predetermined rule, which is in this case entry into the no-fly zone 215. This action may include a sanction against the operator or the drone such as a fine or evasive against the drone such as firing a projectile at the unauthorised drone 215, safely capturing the drone or perform signal jamming or to take control of the drone remotely by intercepting and modifying control signals.

Before this action is taken, evidence from a second UAV will be captured to ensure that such action is not incorrectly taken. This evidence will reduce the likelihood of incorrect action being taken against a UAV.

Figure 2C:
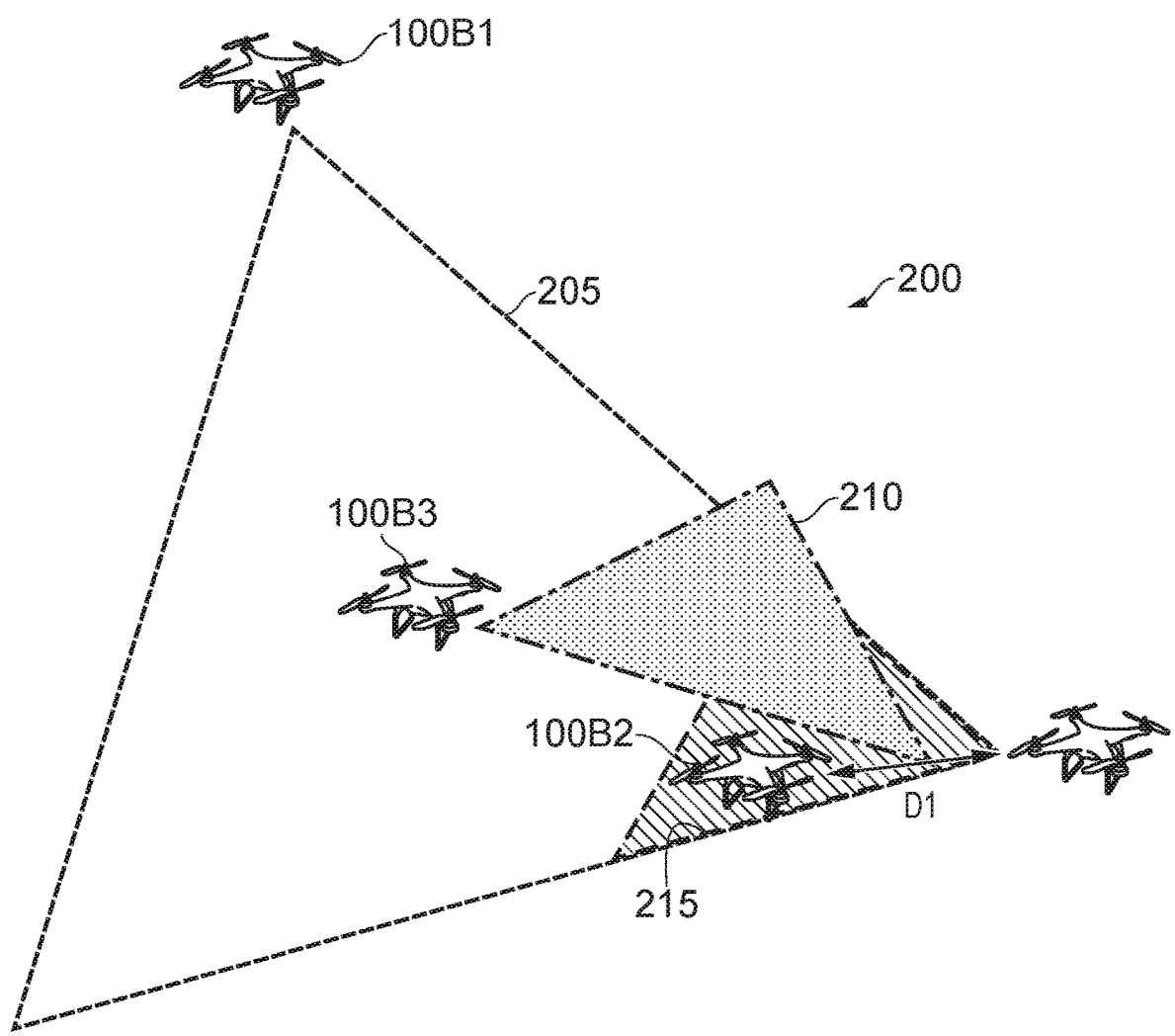

Referring to FIG. 2C, the unauthorised drone 100B2 moves from its original position where the breach first occurred (shown in FIG. 2A) by a distance D1. This movement is carried out over a time period. As will be explained later, this distance will be used in embodiments to determine whether a second drone will be required for secondary evidence gathering.

Figure 2D:
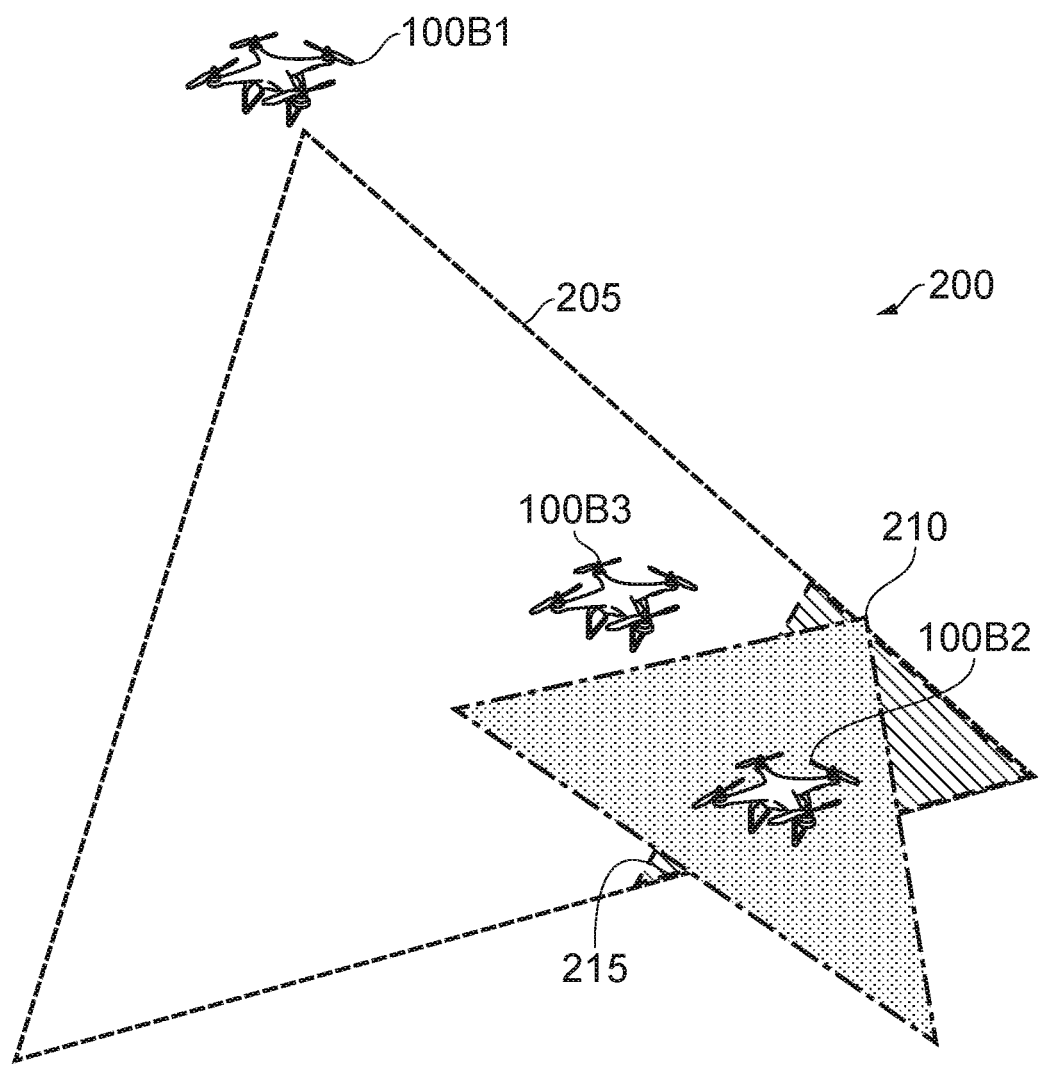

Referring to FIG. 2D, the position of the second drone 100B3 moves so that the field of view of the second drone 100B3 captures the unauthorised drone 100B2. This movement may be at the request of the surveillance drone 100B3 or at the request of the Global UTM Association. The second drone 100B3 then captures secondary evidence of the unauthorised drone 100B2 being located in the no-fly zone and thus being in breach of the predetermined rule.

Once the secondary evidence is captured, further action may be taken against the unauthorised drone 100B2 or the operator of the unauthorised drone 100B2.

Although the foregoing describes the second drone 100B3 as being closer to the unauthorised drone 100B2 than the surveillance drone 100B1, the disclosure is not so limited. In some instances, the surveillance drone 100B1 may move closer to the unauthorised drone 100B2 than the second drone 100B3. In addition, the position of the surveillance drone 100B1 and the second drone 100B3 may be selected so that different views of the unauthorised drone 100B2 are captured. This will ensure that sufficient evidence is captured.

Moreover, the secondary evidence captured by the second drone 100B3 and the evidence captured by the surveillance drone 100B1 may have time stamps included. This indicates the time that the evidence was captured. This indicates that the evidence was contemporaneous. Such evidence may be stored in an immutable form or placed on a block chain to ensure that the evidence is not tampered with. In this regard, prior to the secondary evidence being captured, a synchronisation signal may be exchanged between the surveillance drone 100B1 and the second drone 100B3 to ensure that their respective times are synchronised.

Further, although the type of evidence captured by the surveillance drone 100B1 and the second drone 100B3 may the same, the disclosure is not so limited. For example, the surveillance drone 100B1 may capture one or more types of evidence such as a radio frequency signature of the unauthorised drone 100B2 and the second drone 100B3 may capture a second, different, type of evidence such as still or moving image of the unauthorised drone 100B2. Other types of evidence may be captured. These may or may not be unique identifiers for the unique drone. They may be regarded as fingerprints which represent variations in the operation of the unauthorised drone, such as noise patterns or a representation of the degree to which rotors are synchronised or otherwise aligned. In other embodiments, the same type of evidence may be captured by the surveillance drone 100B1 and the second drone 100B3.

Figure 3A:
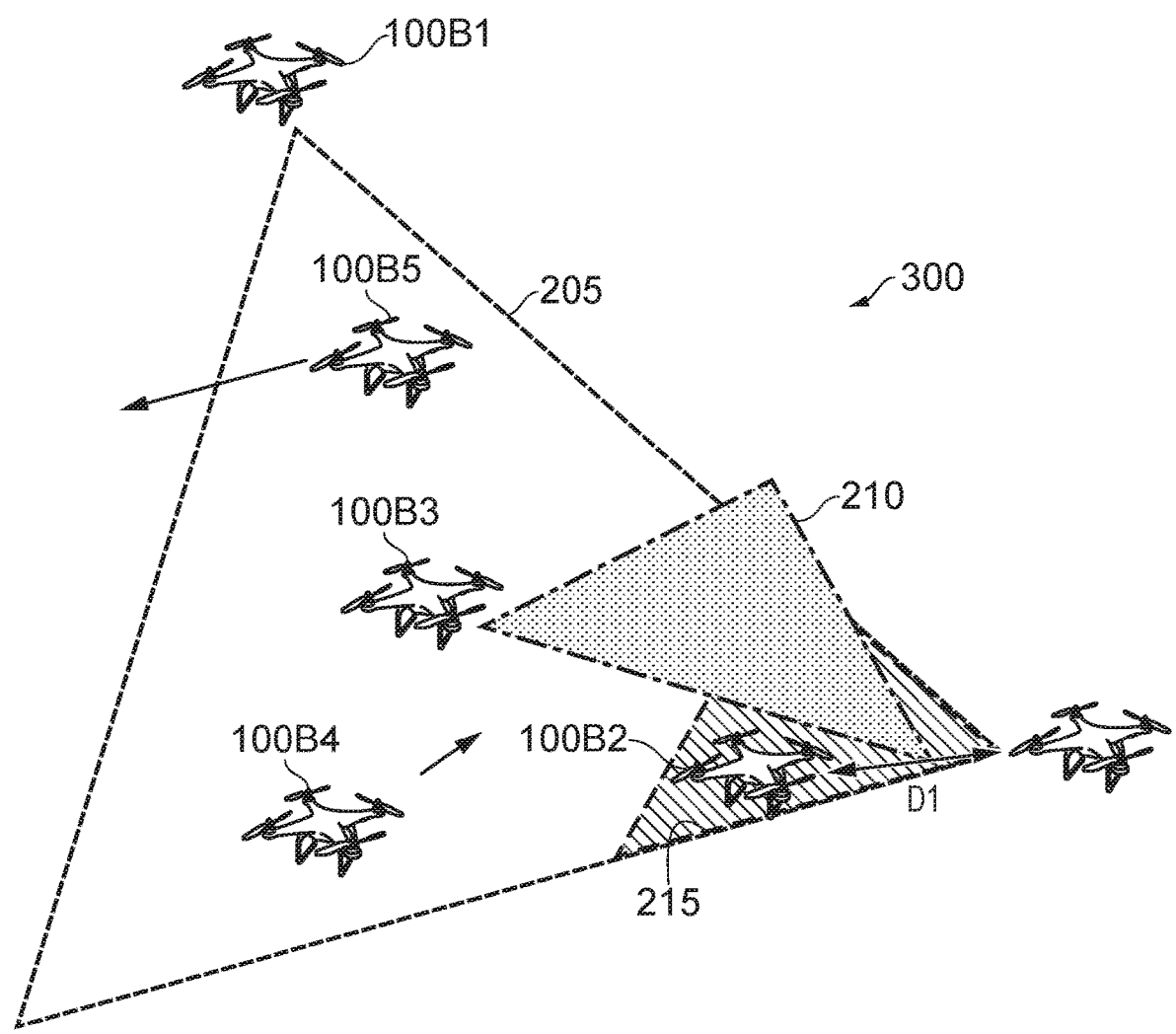
FIG. 3A shows an embodiment 300 that is similar to that shown in FIG. 2C.
Figure 3B:
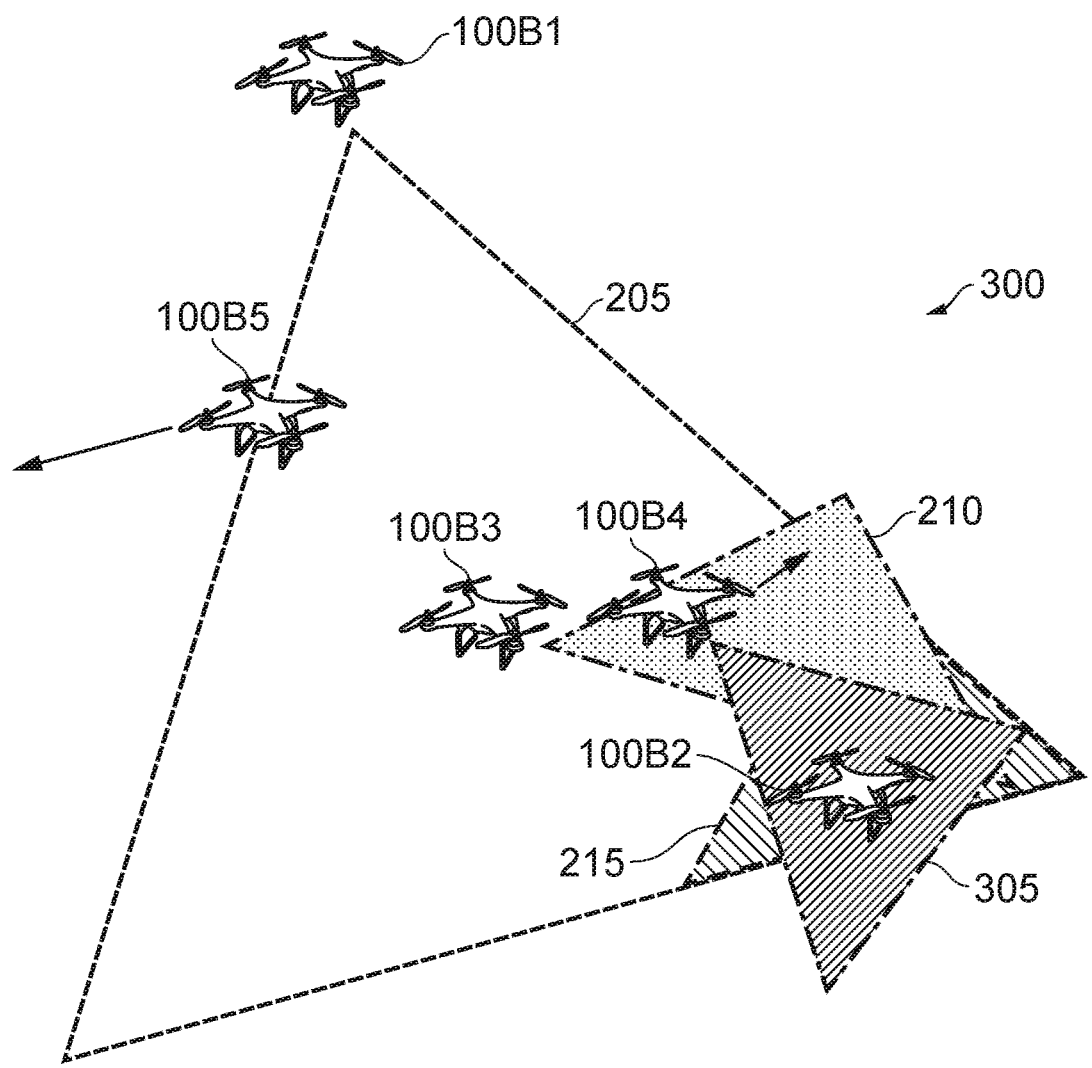
FIG. 3B shows the situation where the third drone 100B4 is selected as the drone to collect the secondary evidence of the unauthorised drone 100B2.

Embodiments of the disclosure are shown in FIGS. 3A and 3B. In these Figures, like reference numerals refer to like features and so explanation of these features is omitted for brevity.

FIG. 3A shows an embodiment 300 that is similar to that shown in FIG. 2C. As will be appreciated, the disclosure of FIG. 2C included one additional drone (the second drone 100B3) within airspace under surveillance by the surveillance drone 100B1. However, in the embodiment of FIG. 3A, a third drone 100B4 and a fourth drone 100B5 is also shown within the airspace under surveillance 205. The third drone 100B4 and the fourth drone 100B5 are following respective flight paths shown by black lines in FIG. 3A. In other words, at the time the third drone 100B4 and the fourth drone 100B5 pass through airspace 205, second evidence of the unauthorised drone 100B2 breaching the predetermined rule of travelling in a no-fly zone is required. Accordingly, and as explained later, a drone is selected from the plurality of other drones (the second drone 100B3, the third drone 100B4 or the fourth drone 100B5) that is most suitable to capture the secondary evidence of the unauthorised drone 100B2. This selection may be made using any one or more criteria for example the drone that has the most suitable evidence capturing equipment, the least deviation from a flight path or the like. Of course, other criteria are envisaged such as the location of the other drone with respect to the unauthorised drone 100B2. The selection of the other drone from the plurality of other drones will be explained later.

FIG. 3B shows the situation where the third drone 100B4 is selected as the drone to collect the secondary evidence of the unauthorised drone 100B2. In this case, the position of the third drone 100B4 is adjusted so that the field of view 305 of the third drone 100B4 captures the secondary evidence of the unauthorised drone 100B2. As noted in respect of FIG. 2D that referenced the second drone 100B3, the secondary evidence of the unauthorised drone 100B2 may be captured from a different angle relative to that captured by the surveillance drone 100B1.

Of course, although only the third drone 100B4 is shown capturing secondary evidence of the unauthorised drone 100B2, the disclosure is not so limited and more than one other drone may be used to capture the secondary evidence. In other instances, a second other drone may be used to capture tertiary evidence of the unauthorised drone 100B2 if the unauthorised drone 100B2 does not move out of the no-fly zone.

The evidence, after capture, may be provided to law enforcement who may fine or prosecute the operator of the unauthorised drone 100B2 or may take action against the drone by firing a projectile at the unauthorised drone 100B2 or in some way safely capture it. Of course, the evidence may be provided to the operator of the unauthorised drone 100B2 along with a penalty charge for operating the unauthorised drone 100B2 in a no-fly zone 215.

Process of Operation

The process of operation of embodiments of the disclosure will now be described with reference to FIGS. 4 to 10.

Figure 4:
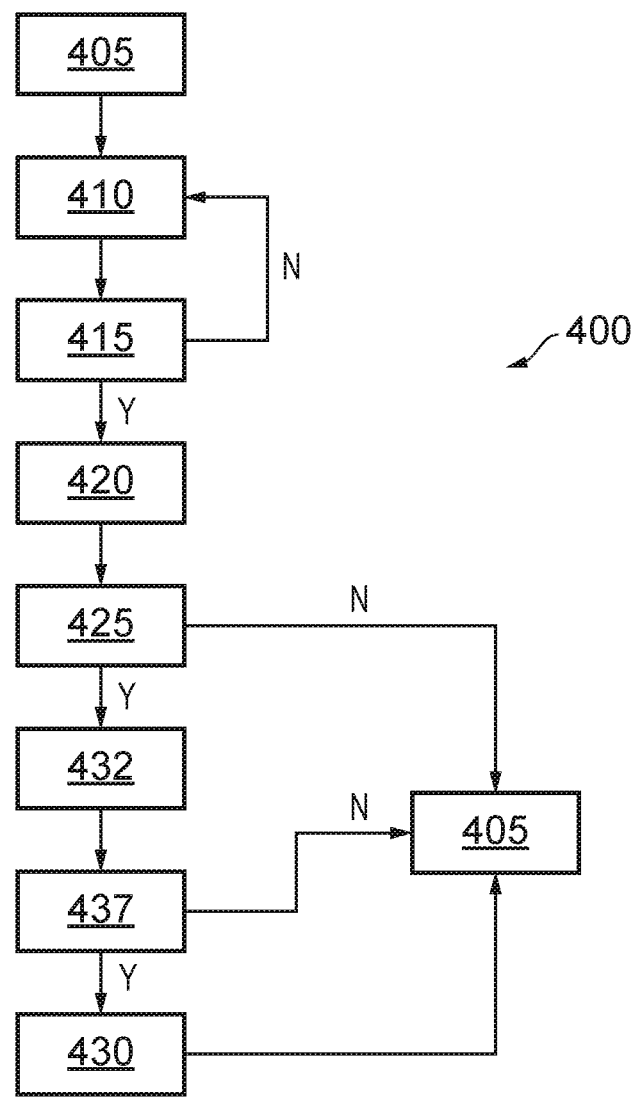
FIG. 4 shows a process 400 according to embodiments of the disclosure.

FIG. 4 shows a process 400 according to embodiments of the disclosure. The process 400 starts at step 405. The process then moves to step 410 where the surveillance drone 100B1 scans and surveys the airspace 205. By scanning the airspace 205, the surveillance drone 100B1 is monitoring the airspace 205. This is ongoing.

The surveillance drone 100B1 monitors the airspace 205 for other UAVs breaching one or more predetermined rules. This is a check carried out in step 415.

Although the predetermined rules may be stored in storage within the surveillance drone 100B1, the disclosure is not so limited. In embodiments, the surveillance drone 100B1 may be updated with new rules via a communication interface (explained later) located within the surveillance drone 100B1. The communication interface may communicate with a control centre (not shown) for updates to be provided. The control centre may be operated by the owner of the surveillance drone 100B1 or by the Global UTM Association or the like. This communication interface allows the surveillance drone 100B1 to be updated with flight paths for other UAVs, changes in no-fly zones or other updates to the predetermined rule stored within the surveillance drone 100B1.

In the event that there are no breaches the "no" path is followed back to step 410 where the surveillance drone 100B1 continues to monitor the airspace 205.

However, in the event that the surveillance drone 100B1 identifies that one or more UAV breaches a predetermined rule, the "yes" path is followed to step 420. In the above example embodiment, the predetermined rule that was breached was that an unauthorised drone 100B2 entered the no-fly zone 215.

In step 420, the surveillance drone 100B1 communicates with the unauthorised drone 100B2 notifying the unauthorised drone 100B2 of the breach. This communication will be carried out by the communication circuitry located within the surveillance drone 100B1. This communication may be achieved using a telecommunications standard such as 5G (machine to machine) communication, although the disclosure is not so limited.

The surveillance drone 100B1 may include information relating to the breach. For example, the surveillance drone 100B1 may identify the specific rule being breached and how the unauthorised drone 100B2 is breaching the rule. For example, in the above example, the surveillance drone 100B1 may indicate that the unauthorised drone 100B2 has entered a no fly zone and may also provide the co-ordinates of the no-fly zone. This means that the surveillance drone 100B1 determines the geographical position of the unauthorised drone 100B2. This allows the unauthorised drone 100B2 to perform corrective action to remedy the breach.

At this time, the surveillance drone 100B1 stores information relating to the breach. For example, the surveillance drone 100B1 may store the geographical position of the unauthorised drone 100B2, identity of the unauthorised drone 100B2 and in correspondence details of the breach of the predetermined rule. For example, the time of the breach, and a copy of the communication sent to the unauthorised drone 100B2 in the storage. In addition, the surveillance drone 100B1 begins capturing and storing evidence of the breach. For example, the location of the unauthorised drone and any information identifying the unauthorised drone or its operators will be stored. For example, images or videos of the unauthorised drone 100B2, any radio signatures, and radar signatures of the drone or the like are captured and stored. In addition, or alternatively, the evidence captured by the surveillance drone 100B1 may be communicated to the control centre. The unauthorised drone 100B2 may be notified by the surveillance drone 100B1 that evidence collation is being carried out.

Moreover, the surveillance drone 100B1 may communicate the breach to the control centre. As noted above, the control centre may by the operator of the surveillance drone 100B1 or may be the Global UTM Association ("UTM" hereinafter). Within the control centre, one or more Unmanned Traffic Management (UTM) servers are located. Therefore, the surveillance drone 100B1 reports the breach to an Unmanned Traffic Management server.

In response to the communication from the surveillance drone 100B1, the unauthorised drone 11B2 may communicate with the surveillance drone 100B1. The unauthorised drone 100B2 may identify itself to the surveillance drone 100B1 using an identifier provided to it. Alternatively or additionally, the unauthorised drone 100B2 may provide information pertaining to permission provided to it to allow the breach. For example, the unauthorised drone 100B2 may have been provided a temporary permit to fly in the no-fly zone 215. In this case, information regarding the permission may be provided by the unauthorised drone 100B2. The information collected by the surveillance drone 100B1 relating to the unauthorised drone 100B2 may be provided to the control centre for checking. The identity of the unauthorised drone 100B2 and/or any relevant permissions indicate the status of the unauthorised drone 100B2 and will be used in step 425 to determine whether secondary evidence is required.

Of course, the unauthorised drone 100B2 may not respond to the communication from the surveillance drone 100B1 or may refuse to provide any information identifying itself or its operator or provide any reason for breaching the predetermined rule.

In other instances, the unauthorised drone 100B2 may not respond to the communication from the surveillance drone 100B1. Instead, the unauthorised drone 100B2 may perform corrective action to remedy the breach. For example, the unauthorised drone 100B2 may move away from the no-fly zone 215.

After the surveillance drone 100B1 has communicated the breach to the unauthorised drone 100B2, the process moves to step 425 where a decision is made regarding whether secondary evidence is required. The operation of the decision process will be explained later, however, if no further evidence is required, the "no" path is followed and the process ends at step 435. An example of a situation where no further evidence is required is if the unauthorised drone 100B2 moves out of the no-fly zone 215 within a predetermined time or if the unauthorised drone 100B2 has a status the permits the breach; for example, if the unauthorised drone 100B2 is an emergency vehicle passing through the no-fly zone to get to a location quickly. The status of the unauthorised drone 100B2 may be communicated to the surveillance drone 100B1 after receiving the notification of the breach. This status may be communicated by the unauthorised drone 100B2 or by the control centre with which the surveillance drone 100B1 communicated.

In the event that secondary evidence is required, the "yes" path is followed to step 430. In step 430, secondary evidence is gathered by a second UAV. In the above example, the secondary evidence is captured by second drone 100B3 or third drone 100B3. The selection of the appropriate drone to collect the secondary evidence is described later.

After the secondary evidence is collected, the process moves to step 437 where a decision is made whether further action should be taken against the unauthorised drone 100B2 or its operator. As noted above, this further action may include firing a projectile at the unauthorised drone 100B2 to stop its flight or may involve contacting law enforcement or the like.

In the event that no further action is required, the "no" path is followed to end at step 435. Alternatively, if further action is required, the process moves to step 432 where the appropriate further action is carried out. The process then ends at step 435.

Figure 5:
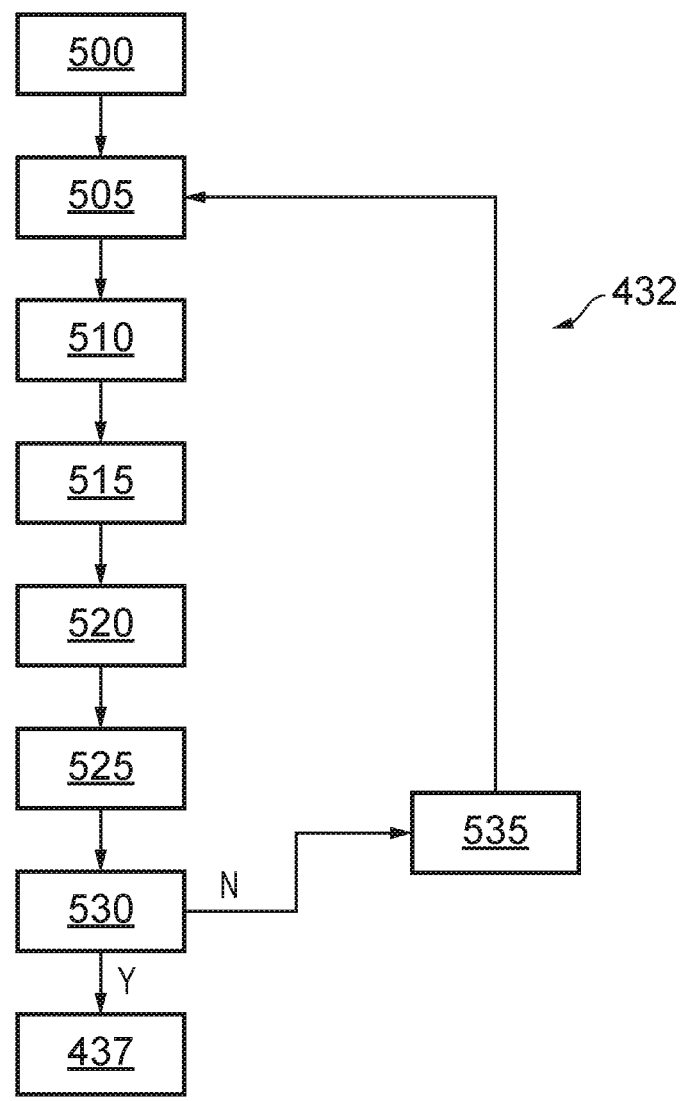
FIG. 5 shows the process of step 432 according to embodiments in more detail.

FIG. 5 shows the process of step 432 according to embodiments in more detail. In other words, FIG. 5 shows the process for collection of secondary evidence.

The process starts at step 500. The process moves to step 505 where the evidence collected by the surveillance drone 100B1 is reviewed. Specifically, the images captured of the unauthorised drone 100B2, the co-ordinates of the location of the unauthorised drone 100B2, the direction of travel and the speed of the unauthorised drone 100B2 and the like are reviewed. This review may be performed by the surveillance drone 100B1 itself, the control centre with which the surveillance drone 100B1 communicates or the UTM.

The process then moves to step 510 where the most appropriate other device is determined. The process in step 510 may be conducted by the UTM, the surveillance drone 100B1 or the control centre with which the surveillance drone 100B1 communicates. In the examples above, the most appropriate device was the second drone 100B3 in FIG. 2D and the third drone 100B4 in FIG. 3B. The process for selecting the most appropriate other device to capture the secondary evidence is described with reference to FIG. 6.

The process then moves to step 515 where the selected other device moves to an appropriate evidence gathering position to capture secondary evidence. The appropriate evidence gathering position may be determined based on the evidence already collected by the surveillance drone 100B1. For example, the evidence already collected by the surveillance drone 100B1 may include images captured using an image sensor. However, more detailed images may be required to identify the unauthorised drone 100B2 or the operator of the unauthorised drone 100B2. In this case, the position of the other device will be selected accordingly. This position information will be provided to the other device by either the UTM or the surveillance drone 100B 1.

The process moves to step 520 where the secondary evidence is gathered by the other device. The secondary evidence is then provided to one or more of the surveillance drone 100B1, the UTM or the control centre associated with the surveillance drone 100B1.

The process then moves to step 525 where the secondary evidence is compared with the evidence provided by the surveillance drone 100B1. During this comparison it is decided whether the evidence captured by the surveillance drone 100B1 is consistent with the secondary evidence captured by the other device. In other words, a check is made to determine whether the unauthorised drone 100B2 is captured in both sets of evidence. In embodiments, the check is made using image comparison to see if the level of similarity between the captured image of the drone is above a threshold level. Other checks of course are envisaged such as identifying the make and/or model of the unauthorised drone 100B2. If the type or model of the drone is identified, this may be compared with a reference image or other reference information such as known owner and the check can confirm the identity of the unauthorised drone 100B2 is the same in both images.

This check may also be made to ensure that the information from the another device complements the captured information. For example, the information from the another device may be photographic evidence of the unauthorised drone 100B2 captured from a different angle or having a different focal length or zoom applied compared with the evidence captured by the surveillance drone 100B1.

Further, the position of the unauthorised drone 100B2 is compared in both sets of evidence. As the secondary evidence is captured a period of time after the evidence is captured by the surveillance drone 100B1, the position of the unauthorised drone 100B2 may have changed. This may mean that the unauthorised drone 100B2 may have rectified the breach by moving out of the no-fly zone 215. In addition, as the time difference between capturing the evidence by the surveillance drone 100B1 and the other device is known, the direction and speed of travel of the unauthorised drone 100B2 is known. This may indicate that the unauthorised drone 100B2 is moving out of the no-fly zone 215.

The process then moves on to step 530. In step 530, a decision is made whether the evidence captured by the surveillance drone 100B1 and the evidence captured by the other device is sufficient to take action. In particular, the evidence may identify the unauthorised drone 100B2 and may indicate that the unauthorised drone 100B2 has not moved by a sufficient distance since the initial communication of the breach was made by the surveillance drone 100B1, or that the unauthorised drone 100B2 has moved further into the no fly zone 215. In this case, the "yes" path is followed to step 437 where action is to be taken.

In the event that the evidence does not meet the threshold, the process follows the "no" path to step 535. In this instance, more evidence may be required to be captured. For example, evidence from a further device may be required to more clearly identify the unauthorised drone 100B2. Alternatively, the unauthorised drone 100B2 may have moved in a direction that indicates that the unauthorised drone 100B2 is leaving the no-fly zone. This may mean that more time is required to see if the unauthorised drone 100B2 leaves the no fly zone.

In step 535, the other device may capture more evidence or another device may be selected to collect a third set of evidence. The process then moves to step 505.

Figure 6:
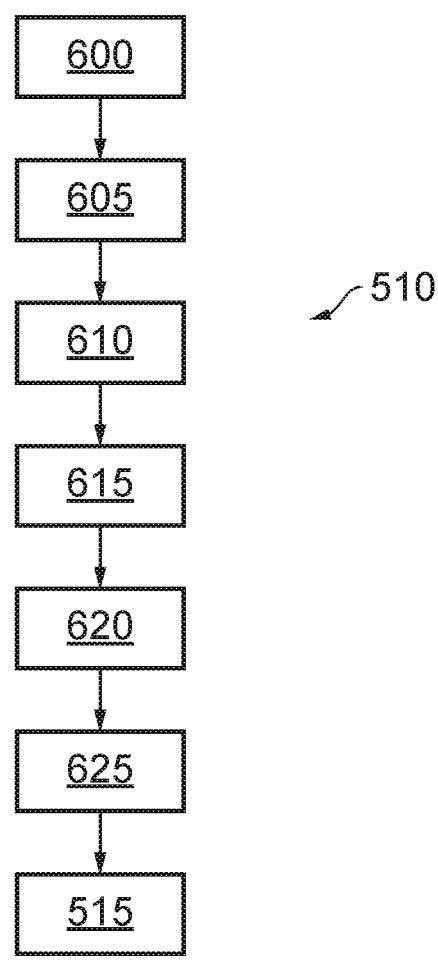
FIG. 6 shows the process of step 510 in more detail.

FIG. 6 shows the process of step 510 in more detail.

The process 510 starts at step 600. The process then moves to step 605 where a call is made to each device (such as UAVs or other drones) in the local area. This call may be made by the UTM or the surveillance drone 100B1. The local area is defined as a predetermined distance or within an airspace a certain distance from a geographic position. The geographic position may be the current location of the unauthorised drone 100B2 or a predicted position of the unauthorised drone 100B2.

The process then moves to step 610 where the evidence gathering capability of each candidate other device within the local area is determined. This may be as a result of a response sent by the candidate devices to the call of step 605 or may be already known by the UTM. Examples of evidence gathering capability includes image sensor, radar, RF scan capability or the like.

The process then moves to step 615 where the most appropriate position of the candidate other devices having the appropriate evidence gathering capabilities is determined. For example, a drone having a radar evidence gathering capability may be more suited to a situation where the unauthorised drone 100B2 is in clouds compared with a drone having only image sensor capabilities. Moreover, the position of the drone having a radar equipped may be more suited to being positioned further from the unauthorised drone than a drone having image sensor capability to avoid backscatter. Moreover, the preferred position of the other drone may differ depending on the evidence captured by the surveillance drone 100B1. For example, if the surveillance drone 100B1 only has an image sensor that has captured one image of the unauthorised drone from side on, the position of the other drone may such that the other drone captures a plan view image of the unauthorised drone 100B2.

In other words, in step 615, the most appropriate position for secondary evidence gathering for at least a subset of each other device is determined.

The process then moves to step 620 where it is determined which of the subset of each other device can moved to the desired position whilst deviating from their current flight plan by an acceptable amount. In other words, the deviation of each of the other devices in the subset from their original flight plan is quantified. This deviation may be a distance deviation or may be a time deviation. If the deviation is below a threshold amount then the other device will be asked to deviate to the position identified in step 615.

The process then moves to step 625 where the other device(s) having a deviation at or below the threshold is/are selected. The process then moves to step 515.

Figure 7:
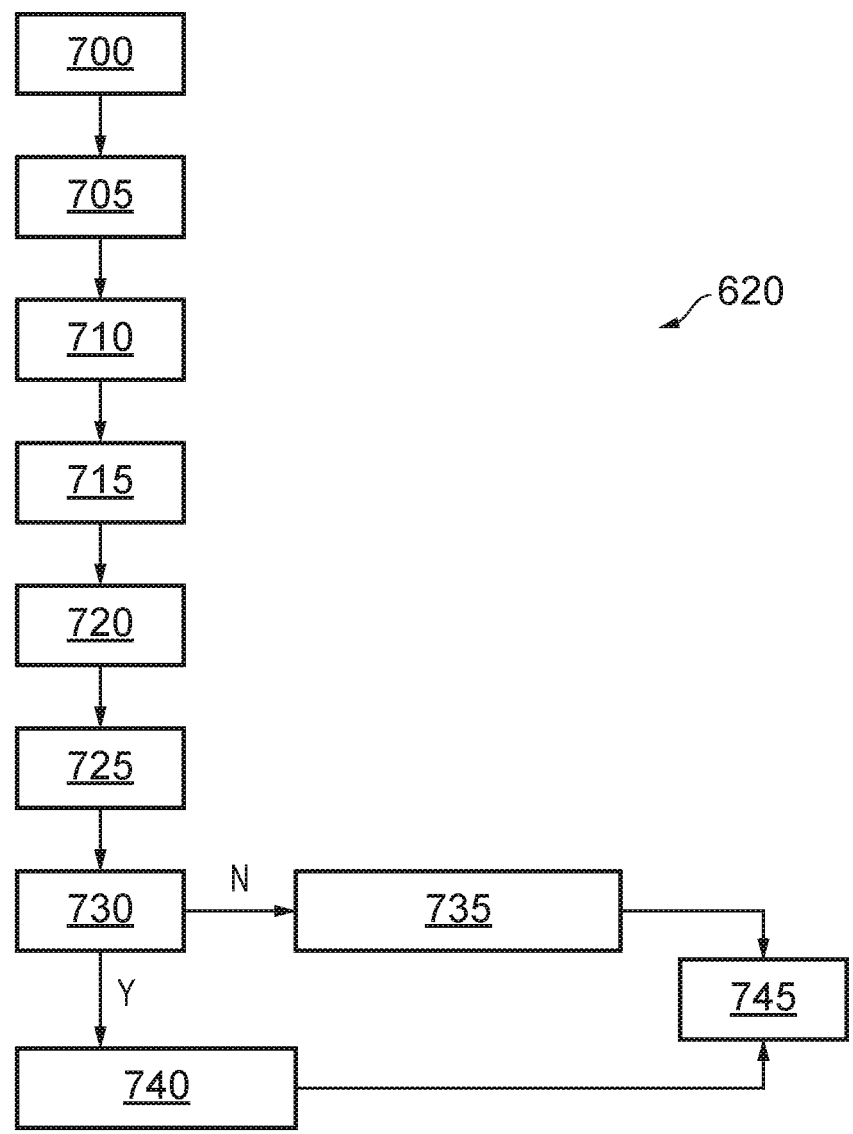
FIG. 7 shows the process of step 620 in more detail.

FIG. 7 shows the process of step 620 in more detail.

The process starts at step 700. The process then moves to step 705 where the current geographical position of the candidate other device is determined. This may be achieved by the candidate other device providing Global Positioning System (GPS) co-ordinates to the surveillance drone 100B1 or the UTM system. The process then moves to step 710 where the end position of the candidate other device is determined. In other words, the final destination of the candidate other device is determined. This may be obtained directly from the candidate other device or may be obtained from its operator. Additionally, the route (i.e. the flight path) of the candidate other device may be determined. As will be apparent later, by knowing the flight path, it is possible to determine the amount of deviation in terms of distance and/or time from the scheduled route for the candidate other device to capture the secondary evidence.

The process then moves to step 715 where the current weather conditions in the locality of the candidate other device and along its flight path is determined. This is useful because if inclement weather occurs later in the flight path, it may not be appropriate for the candidate other device to be diverted as to do so would increase the likelihood of a delay being applied to the route. In addition, the current speed and direction and the operational evidence capturing capability is determined. Furthermore any previous delay along the flight path is determined at this point. This is because if a candidate other device has already been delayed, it may not be appropriate to increase that delay any further.

The process moves to step 720 where the evidence gathering position for the operational evidence capturing capability is determined. This is determined in the same manner and having the same considerations as set out in respect of step 615.

The process moves to step 725 where the time of arrival at the final destination of the candidate other device having been diverted to capture the secondary evidence is calculated. In embodiments, this time of arrival may include any further delays for inclement weather or other flying conditions.

The process then moves to step 730 where a decision is made to determine whether delay introduced by the diversion to capture the secondary evidence is below a threshold.

This is achieved by comparing the estimated time of arrival of the candidate other device with diversion with the estimated time of arrival of the candidate other device without diversion. If the delay is at or below the threshold delay, the "yes" path is followed and the candidate other device is part of the subset of devices in step 740. Alternatively, if the delay is above the threshold, then the "no" path is followed and the candidate other device is discarded in step 735. The process then moves on to the next candidate in step 745. The process of FIG. 7 is carried out for all candidate other devices.

It should be noted that threshold delay noted in step 730 may be altered on the basis of numerous factors. For example, if the candidate other device is carrying a time critical cargo such as a human organ for transplant, then the amount of delay that can be introduced in a flight path is very small. In other instances, if the operator of the candidate other device wishes for their drones to operate to a very tight schedule, the operator may pay an additional fee to the Global UTM Association to have a very low threshold delay. Moreover, the operator of the candidate other device may be paid by the Global UTM Association to have a larger threshold if the operator can accept a large threshold time.

Figure 8:
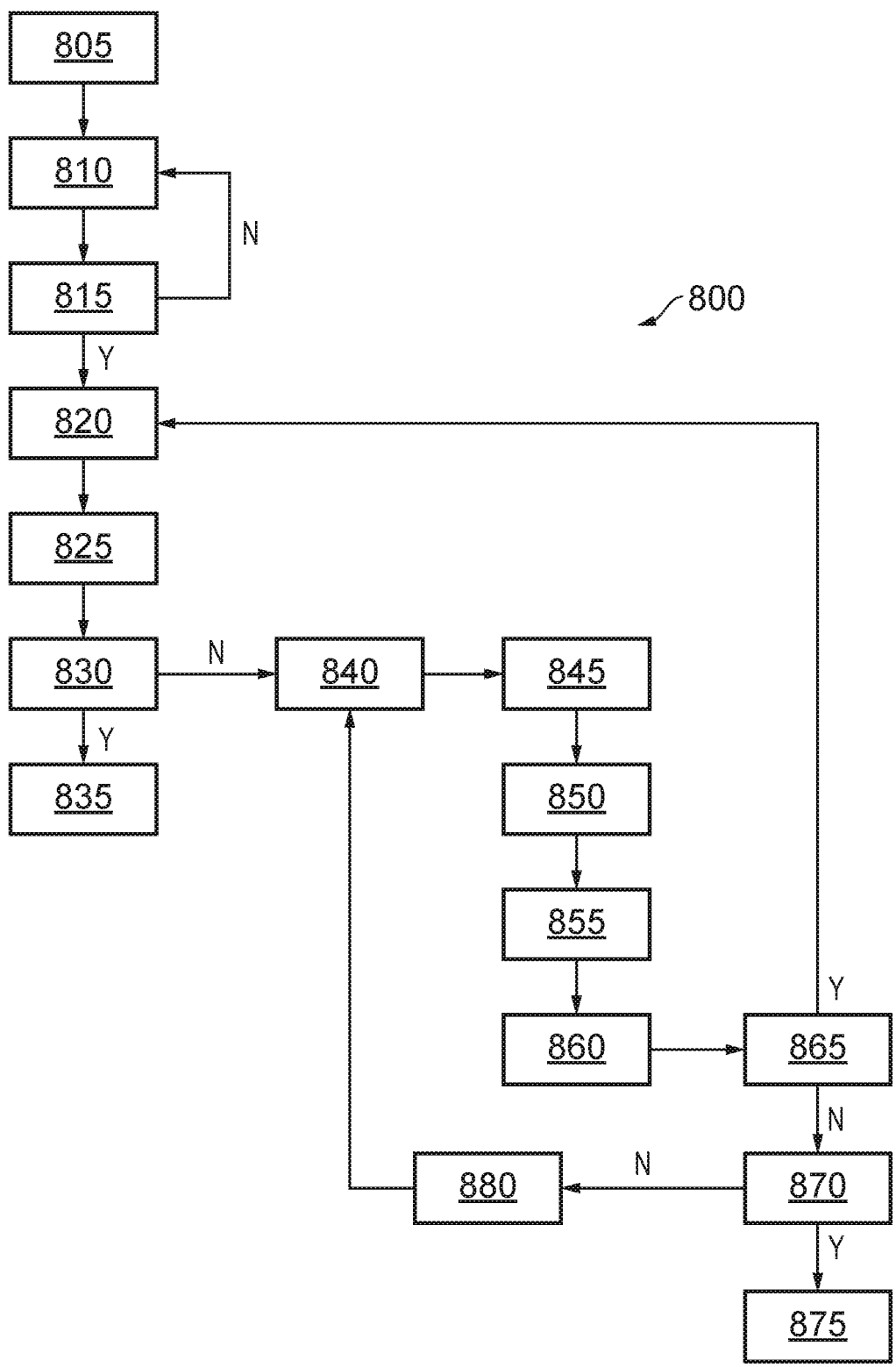
FIG. 8 shows an embodiment of the disclosure.

FIG. 8 shows an embodiment of the disclosure. In some instances, the unauthorised drone 100B2 may provide its identity to the surveillance drone 100B1 but may remain in the no-fly zone 215. This embodiment addresses this situation.

The process 800 starts at step 805. The process moves to step 810 where the surveillance drone 100B1 scans airspace 205. The process moves to step 815 where the unauthorised drone 100B2 is located within the airspace 205. The surveillance drone 100B1 determines the geographical position of the unauthorised drone 100B2. Specifically, the surveillance drone 100B1 determines whether the unauthorised drone 100B2 is in the no-fly zone 215. If the unauthorised drone 100B2 is not in the no-fly zone 215, the "no" path is followed back to step 810. However, if the unauthorised drone 100B2 is in the no-fly zone 215, the "yes" path is followed to step 820 where the unauthorised drone 100B2 is contacted and is notified of the breach of a predetermined rule (that it has entered the no-fly zone 215). This contact may be made by any one of the surveillance drone 100B1, the control centre which operates the surveillance drone 100B1 or the UTM system. The process moves to step 825 where the unauthorised drone 100B2 provides an acknowledgement to the surveillance drone 100B1. The acknowledgement, in embodiments, includes information identifying the unauthorised drone 100B2. This information may uniquely identify the unauthorised drone 100B2 locally or globally.

Although not specifically shown in FIG. 8, in the event that no identification is provided by the unauthorised drone 100B1, the surveillance drone 100B1 may move to step 840 to notify another device of the location of the unauthorised drone 100B2.

The process then moves to step 830 where a check is made by the surveillance drone 100B1 or the UTM using the coordinates of the unauthorised drone 100B2 whether the unauthorised drone 100B2 is moving away from the no-fly zone 215. This check is made by checking whether the unauthorised drone 100B2 moves a predetermined distance or more in a predefine time. In other words, a check is made of the movement of the unauthorised drone 100B2 being below a threshold distance after a predetermined time.

In the event that the unauthorised drone 100B2 moves away from the no-fly zone 215 in a predetermined time after notification of the breach, the "yes" path is followed to step 835 where an indication of the breach and the identity of the unauthorised drone 100B2 and its operator are stored.

However, in the event of the movement being below a threshold amount (distance) after the predetermined time, the "no" path is followed to step 840. In other words, the geographical position of the unauthorised drone 100B2 is located at a second time different to the time in step 815.

In step 840, one or more other devices are notified. These are notified that the movement being below the threshold amount or if no identification is provided by the unauthorised drone 100B2. In other words, the one or more other devices are notified of the breach. The other devices may include other drones such as the second drone 100B3, the control centre controlling the surveillance drone 100B1 or the Global UTM Association. The notification to the one or more other devices may be an instruction to capture evidence. The position of the unauthorised drone 100B2 may also be provided in the instruction. This instruction may be derived from a calculation that the movement is below the threshold amount.

The process moves to step 845 where one or more drones (which may include the notified one or more other devices) are instructed to move to an evidence gathering position. The selection of appropriate devices and the selection of the appropriate evidence gathering position have been described above. Example mechanisms for selecting the another device is on the basis of at least one of: the position of the another the device relative to the UAV; the flight path of the another device; the flight path of the UAV as noted above. In embodiments, the selection on the basis of the flight path is advantageous to reduce downstream issues for the other device and for other devices that interact with that device.

The process moves to step 850 where one of the other devices estimates the position of the unauthorised drone 100B2 from the captured secondary evidence. This is sent to the UTM Association, the surveillance drone 100B1 or its own control centre in step 855. In other words, the surveillance drone 100B1 or the UTM Association receives information from the other device. This information relates to the position of the unauthorised drone 100B2.

The process then moves to step 860 where the position difference between the reported position of the unauthorised drone 100B2 as defined by the other device (such as the second device 100B3) and the position of the unauthorised drone 100B2 as defined by the surveillance drone 100B1 is calculated. In other words, a comparison is made of the received information with the monitored movement of the UAV following communication of the breach.

The process then moves to step 865 where a check is made to determine whether the unauthorised drone 100B2 has moved sufficiently in the predetermined time. In other words, a check is performed to see if the unauthorised drone 100B2 has moved or is moving towards leaving the no-fly zone 215. In the event that the unauthorised drone 100B2 has made sufficient progress, the "yes" path is followed back to step 820 where the unauthorised drone 100B2 is contacted again to inform it that it is making progress to leave the no-fly zone 215. At this stage, a time period may be provided giving the unauthorised drone 100B2 a time limit to leave the no-fly zone 215.

In the event that the comparison in step 865 is negative, the "no" path is followed to step 870. At step 870 a further check is made to establish whether the captured evidence is sufficient by, for example, the evidence being from two sources and it identifying the unauthorised drone and its operator as noted above.

In the event that the evidence is sufficient, the "yes" path is followed to step 875. In this case, action is taken to disable the unauthorised drone 100B2. In embodiments, the disabling the unauthorised drone 100B2 may include at least one of: jamming a signal controlling the operation of the unauthorised drone 100B2, hitting the unauthorised drone 100B2 with a projectile or colliding with the unauthorised drone 100B2. In embodiments disabling, may involve hindering the photographic or image sensing capabilities of the unauthorised drone 100B2, for example by generating interfering or disturbing signals at the likely target of the unauthorised drone 100B2 such a concert venue or film set. In embodiments, the disabling may be delayed until the unauthorised drone 100B2 moves to airspace where it is safe to perform the disabling. Moreover, although the surveillance drone 100B1 may itself perform the disabling, the disclosure is not so limited. In embodiments, the disabling may be carried out by a different device. For example, another drone may be instructed to perform the disabling or a control centre may perform the disabling. The disabling will be requested by the surveillance drone 100B1, however.

However, in the event that there is not sufficient evidence, the "no" path is followed to step 880 where a further other device is asked to capture more evidence. The process then returns to step 840.

Figure 9:
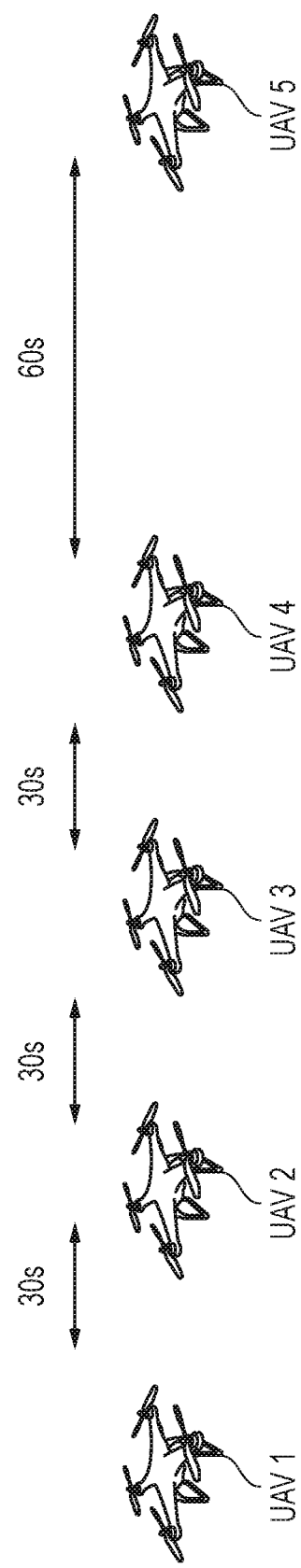
FIG. 9 shows an embodiment according to the present disclosure.

FIG. 9 shows an embodiment according to the present disclosure. In this embodiment, flight paths that pass through the same volume of airspace need to be carefully planned in time. This is to avoid collisions. In some instances, the flight plan of one UAV (such as a drone or satellite) may be delayed slightly. This may mean that in order to avoid a collision involving the delayed UAV, the scheduled time of other UAVs passing through the airspace will need to be changed.

Embodiments depicted in FIG. 9 aim to address this issue. In this case, there are 5 UAVs (UAV1-UAV5) passing through an airspace. Each of the UAVs are separated by 30 seconds except for the time gap between UAV4 and UAV5 which is 1 minute. If UAV1 is then delayed by 20 seconds, then the gap between UAV1 and UAV2 would drop to 10 seconds. This is very short and may lead to a collision. In embodiments of the disclosure, instead, a delay of 20 seconds is applied to the flight plan of UAV4, a delay of 20 seconds is applied to the flight plan of UAV3 and a delay of 20 seconds is applied to the flight plan of UAV2. This means that the time gap between UAV 4 and UAV 5 is reduced by 20 seconds to 40 seconds and the time gap between the remaining UAVs is maintained at 30 seconds. This reduces the likelihood of a collision. A computer my use operating instructions to search for a relatively larger time gap between flight plans for respective UAVs in the airspace and generate modified flight plans for some or all of the flight plans occurring before that relatively larger time gap. In embodiments, this can be more efficient, timely or safer than modifying a first flight plan, calculating its effect on second flight plan, changing the second flight plan, calculating its effect on a third flight plan and so on. The computer may make real time concurrent alterations to at least some of the respective flight plans of UAV1-UAV5.

In other words, a time gap along the flight path is found that exceeds the delay by a comfortable margin. The UAVs passing through the airspace between the delayed UAV and the larger time gap are then delayed by an amount of time equal to the delay. This allows the delay to be better managed along the flight path and allows more UAVs to pass through an airspace in a given unit of time.

Figure 10:
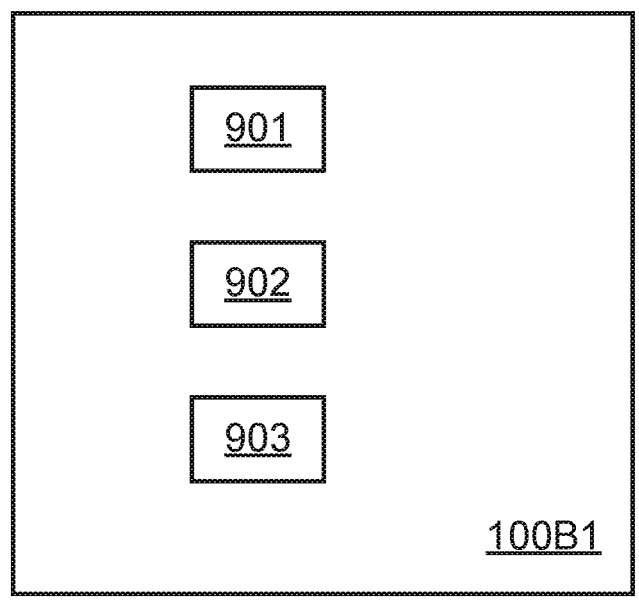
FIG. 10 exemplifies components of the surveillance drone 100B1.

FIG. 10 exemplifies components of the surveillance drone 100B1.

The surveillance drone 100B1 comprises a communication interface 901 for performing wireless communication (e.g. radio communication) with its control centre and other devices including the unauthorised drone 100B2 and the second (and other) drones and a storage medium 902 for storing digital data (e.g. a hard disk drive, solid state drive, tape drive or the like). Each of these components is controlled by a controller 900. The controller 900 comprises the circuitry which performs other operations of the surveillance drone 100B1 mentioned above. In addition, sensors 903 are provided that allow the surveillance drone 100B1 to detect other devices (such as UAVs) such as image sensors, RF sensors or the like.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Embodiments of the present technique can generally described by the following numbered clauses:

1. A method comprising:
   locating an Unmanned Aerial Vehicle (UAV) which is in breach of a predetermined rule;
   communicating an indication of the breach to the UAV;
   monitoring the movement of the UAV following the communication of the breach; and in the event of the movement being below a threshold amount after a predetermined time, the method comprises:
   notifying another device of the movement being below the threshold amount.

2. A method comprising:
  locating an Unmanned Aerial Vehicle (UAV) which is in breach of a predetermined rule;
   communicating an indication of the breach to the UAV;
   and in the event that no response is received from the UAV that identifies the UAV, the method comprises:
   notifying another device of the location of the UAV.
3. A method according to clause 1 or 2, wherein the predetermined rule is to not enter a no-fly zone.
4. A method according to any preceding clause, wherein the another device is a UTM Association, wherein the method further comprises the UTM association instructing a further UAV to move to a position to capture evidence of the UAV which is breach of the predetermined rule.
5. A method according to any one of clause 1 to 3, wherein the another device is selected from a plurality of another devices, the another device being selected on the basis of at least one of: the position of the another the device relative to the UAV; the flight path of the another device; the flight path of the UAV and the type of sensing equipment located on the another device.
6. A method comprising:
  locating the geographical position of an Unmanned Aerial Vehicle (UAV) at a first time and at a second, different, time;
  capturing information identifying the UAV;
  notifying another device of the location of the UAV at the second time, the another device being selected from a plurality of another devices, wherein the another device is selected based on the flight plan of the another device.
7. A method according to any preceding clause, comprising:
  receiving information from the another device;
  comparing the received information with the monitored movement of the UAV following communication of the breach; and in the event of a positive comparison the method further comprises:
  issuing a request to disable the UAV.
8. A method according to clause 7, wherein prior to the step of issuing a request to disable the UAV, the method further comprises:
  receiving information identifying the UAV from the another device; and
  comparing the received information identifying the UAV from the another device with the captured information; and in the event of a positive comparison;
  issuing the request to disable the UAV.
9. A method according to clause 8, wherein the received information from the another device complements the captured information.
10. A method according to any one of clause 7, 8 or 9, wherein the disabling comprises at least one of: jamming a signal controlling the operation of the UAV, hitting the UAV with a projectile or colliding with the UAV, capturing the drone, and take control of the drone remotely by intercepting and modifying control signals.
11. A computer program product comprising computer readable instructions which, when loaded onto a computer, configures the computer to perform a method according to any one of clause 1 to 10.
12. A device comprising: a sensor, communication interface and a processor, wherein the sensor and the communication interface operate under the control of the processor;
  wherein the sensor is configured to locate an Unmanned Aerial Vehicle (UAV) which is in breach of a predetermined rule and the communication interface is configured to communicate an indication of the breach to the UAV; and the processor is configured to:
   monitor the movement of the UAV following the communication of the breach; and in the event of the movement being below a threshold amount after a predetermined time; and
   notify, using the communication interface, another device of the movement being below the threshold amount.
13. A device comprising: a sensor, communication interface and a processor, wherein the sensor and the communication interface operate under the control of the processor;
  wherein the sensor is configured to locate an Unmanned Aerial Vehicle (UAV) which is in breach of a predetermined rule and the communication interface is configured to communicate an indication of the breach to the UAV; and the processor is configured such that in the event that no response is received from the UAV that identifies the UAV, the processor is configured to:
   notify, using the communication interface, another device of the location of the UAV.
14. A device according to clause 12 or 13, wherein the predetermined rule is to not enter a no-fly zone.
15. A device according to any one of clause 12 to 14, wherein the another device is a UTM Association, wherein the UTM association is configured to instruct a further UAV to move to a position to capture evidence of the UAV which is breach of the predetermined rule.
16. A device according to any one of clause 12 to 14, wherein the another device is selected from a plurality of another devices, the another device being selected on the basis of at least one of: the position of the another the device relative to the UAV; the flight path of the another device; the flight path of the UAV and the type of sensing equipment located on the another device.
17. A device comprising a sensor, communication interface and a processor, wherein the sensor and the communication interface operate under the control of the processor;
  wherein the sensor is configured to locate the geographical position of an Unmanned Aerial Vehicle (UAV) at a first time and at a second, different, time; and
   capture information identifying the UAV; and the communication interface is operable under the control of the processor to:
   notify another device of the location of the UAV at the second time, the another device being selected from a plurality of another devices, wherein the another device is selected based on the flight plan of the another device.
18. A device according to any one of clause 12 to 17, wherein the processor is configured to:
  receive, via the communication interface, information from the another device;
  compare the received information with the monitored movement of the UAV following communication of the breach; and in the event of a positive comparison the processing circuitry is configured to:
  issue, via the communication interface, a request to disable the UAV.
19. A device according to clause 18, wherein prior to the step of issuing a request to disable the UAV, the processor is configured to:
  receive, via the communication interface, information identifying the UAV from the another device;
  compare the received information identifying the UAV from the another device with the captured information; and in the event of a positive comparison; and issue, via the communication interface, the request to disable the UAV.

20. A method according to clause 19, wherein the received information from the another device complements the captured information.

21. A device according to any one of clause 18, 19 or 20, wherein the disabling comprises at least one of: jamming a signal controlling the operation of the UAV, hitting the UAV with a projectile or colliding with the UAV, capturing the drone, and take control of the drone remotely by intercepting and modifying control signals.

The invention claimed is:

1. A method comprising:
    locating, by a first surveillance device, an Unmanned Aerial Vehicle (UAV) which is in breach of a predetermined rule, wherein the predetermined rule is to not enter a no-fly zone;
    communicating, from the first surveillance device, an indication of the breach to the UAV;
    monitoring, by the first surveillance device, the location and movement of the UAV following the communication of the breach;
    upon determining that a value of the movement of the UAV in a direction away from the no-fly zone is below a threshold amount after a predetermined amount of time notifying, via circuitry, an Unmanned Traffic Management (UTM) server of the movement being below the threshold amount;
    upon notifying the UTM server of the movement being below the threshold, instructing, by the UTM server, a second surveillance device to move to a position to capture evidence of the UAV that is in breach of the predetermined rule;
    determining that the captured evidence is above a second threshold; and
    upon determining that the captured evidence is above the second threshold, determining that a disabling action should be taken against the UAV.

2. The method according to claim 1, wherein the second surveillance device is a surveillance UAV.

3. The method according to claim 1, wherein the second surveillance device is selected from a plurality of devices, the second surveillance device being selected on the basis of at least one of: the position of the second surveillance device relative to the UAV; the flight path of the second surveillance device; the flight path of the UAV and the type of sensing equipment located on the second surveillance device.

4. The method of claim 1, wherein the locating further comprises:
    locating the geographical position of the UAV at a first time and at a second, different, time;
    capturing information identifying the UAV;
    notifying via circuitry the surveillance device of the location of the UAV at the second time, the surveillance device being selected from a plurality of surveillance devices, wherein the surveillance device is selected based on the flight plan of the surveillance device.

5. The method according to claim 1, further comprising:
    receiving information identifying the UAV from the surveillance device; and
    comparing the received information identifying the UAV from the surveillance device with the captured information; and in the event of a positive comparison;
    issuing the request to disable the UAV.

6. The method according to claim 5, wherein the received information from the surveillance device complements the captured information.

7. The method according to claim 5, wherein the disabling comprises at least one of: jamming a signal controlling the operation of the UAV, hitting the UAV with a projectile or colliding with the UAV, capturing the UAV, and take control of the UAV remotely by intercepting and modifying control signals.

8. A non-transitory computer readable medium storing computer readable instructions which, when loaded onto a computer, configures the computer to perform the method according to claim 1.

9. A device comprising: a sensor, communication interface and a circuitry, wherein the sensor and the communication interface operate under the control of the circuitry;
    wherein the sensor is configured to locate an Unmanned Aerial Vehicle (UAV) which is in breach of a predetermined rule and the communication interface is configured to communicate an indication of the breach to the UAV, wherein the predetermined rule is not to enter a no-fly zone; and the circuitry is configured to:
    monitor the location and movement of the UAV following the communication of the breach;
    upon determining that a value of the movement of the UAV in a direction away from the no-fly zone is below a threshold amount after a predetermined amount of time notify, using the communication interface, another device of the movement being below the threshold amount, wherein the another device is an Unmanned Traffic Management (UTM) server, wherein the UTM server is configured to instruct a surveillance device to move to a position to capture evidence of the UAV which is in breach of the predetermined rule.

10. The device according to claim 9, wherein the surveillance device is selected from a plurality of another devices, the surveillance device being selected on the basis of at least one of: the position of the another the device relative to the UAV; the flight path of the another device; the flight path of the UAV and the type of sensing equipment located on the another device.

11. The device according to claim 9, wherein the circuitry is further configured to:
    receive, via the communication interface, information identifying the UAV from the surveillance device;
    compare the received information identifying the UAV from the surveillance device with the captured information; and in the event of a positive comparison; and
    issue, via the communication interface, the request to disable the UAV.

12. The device according to claim 11, wherein the received information from the surveillance device complements the captured information.

13. The device according to claim 11, wherein the disabling comprises at least one of: jamming a signal controlling the operation of the UAV, hitting the UAV with a projectile or colliding with the UAV, capturing the UAV, and take control of the UAV remotely by intercepting and modifying control signals.

* * * * *